United States Patent
Casolaro et al.

(10) Patent No.: US 10,252,813 B2
(45) Date of Patent: Apr. 9, 2019

(54) METHOD AND A DEVICE FOR ASSISTING THE PILOTING OF AN AIRCRAFT, AND AN AIRCRAFT

(71) Applicant: AIRBUS HELICOPTERS, Marignane (FR)

(72) Inventors: Didier Casolaro, Rognac (FR); Gregory Abbas, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 72 days.

(21) Appl. No.: 15/607,939

(22) Filed: May 30, 2017

(65) Prior Publication Data
US 2017/0341771 A1    Nov. 30, 2017

(30) Foreign Application Priority Data

May 30, 2016 (FR) ..................................... 16 00871

(51) Int. Cl.
*B64D 43/00* (2006.01)
*B64C 27/00* (2006.01)
*B64C 27/54* (2006.01)
*B64C 27/04* (2006.01)

(52) U.S. Cl.
CPC ............ *B64D 43/00* (2013.01); *B64C 27/006* (2013.01); *B64C 27/54* (2013.01); *B64C 27/04* (2013.01); *F05D 2220/329* (2013.01)

(58) Field of Classification Search
None
See application file for complete search history.

(56) References Cited

U.S. PATENT DOCUMENTS

| 3,744,928 | A | * | 7/1973 | Hansen | ................. B64C 27/006 416/31 |
| 5,915,273 | A | | 6/1999 | Germanetti | |
| 6,195,598 | B1 | * | 2/2001 | Bosqui | ................. B64D 43/00 701/3 |
| 6,411,869 | B2 | | 6/2002 | Permanne | |
| 7,212,942 | B2 | * | 5/2007 | Vollum | ..................... G01L 3/24 702/127 |

(Continued)

FOREIGN PATENT DOCUMENTS

| EP | 2518582 | 10/2012 |
| FR | 2749545 | 12/1997 |

(Continued)

OTHER PUBLICATIONS

French Search Report for French Application No. FR 1600871, Completed by the French Patent Office, Dated Jan. 25, 2017, 7 Pages.

*Primary Examiner* — David P. Merlino
(74) *Attorney, Agent, or Firm* — Brooks Kushman P.C.

(57) ABSTRACT

A method of assisting the piloting of an aircraft, such as a helicopter, includes determining a limiting power margin of a power plant of the aircraft relative to a power limit at an operating rating of an engine of the power plant. The limiting power margin is transformed into a collective pitch margin for the operating rating. The collective pitch margin represents the margin between a current collective pitch of blades of a main rotor of the aircraft and a collective pitch limit of the blades of the main rotor. The collective pitch limit is determined and then displayed on a display of the aircraft for a pilot to view.

21 Claims, 2 Drawing Sheets

(56) References Cited

U.S. PATENT DOCUMENTS

| | | |
|---|---|---|
| 8,442,740 B2 | 5/2013 | Rossotto |
| 8,825,228 B2 | 9/2014 | Corpron et al. |
| 2004/0010354 A1* | 1/2004 | Nicholas ............... B64C 13/503 |
| | | 701/4 |
| 2010/0312421 A1* | 12/2010 | Eglin .................... B64D 43/00 |
| | | 701/14 |

FOREIGN PATENT DOCUMENTS

| | | |
|---|---|---|
| FR | 2756256 | 5/1998 |
| FR | 2809082 | 11/2001 |
| FR | 2973340 | 10/2012 |

\* cited by examiner

METHOD AND A DEVICE FOR ASSISTING THE PILOTING OF AN AIRCRAFT, AND AN AIRCRAFT

CROSS-REFERENCE TO RELATED APPLICATIONS

This application claims priority to French patent application No. FR 16 00871 filed on May 30, 2016, the disclosure of which is incorporated in its entirety by reference herein.

BACKGROUND OF THE INVENTION

(1) Field of the Invention

The present invention relates to a method and to a device for assisting the piloting of an aircraft, and it also relates to an aircraft. In particular, the aircraft is a rotorcraft having a rotor contributing at least to providing the rotorcraft with lift, and possibly also with propulsion.

(2) Description of Related Art

Rotorcraft are generally provided with a power plant comprising at least one engine, such as a fuel burning engine of the free turbine turboshaft engine type. Power is then taken from a low pressure stage of each free turbine that rotates at a speed in the range 20,000 revolutions per minute (rpm) to 50,000 rpm, for example. Thereafter, the power plant includes a speed-reducing gearbox for connecting the free turbine to the main rotor, given that the speed of rotation of the main rotor lies substantially in the range 200 rpm to 400 rpm. Such a speed-reducing gearbox power transmission is referred to as the "main gearbox" (MGB).

The thermal limitations of an engine, and the torque limitations of the MGB serve to define an operating envelope for the engine covering numerous operating ratings. In particular, a rotorcraft engine may operate at at least one of the following normal ratings:

a takeoff rating corresponding to a level of torque for the MGB and a level of heating for the engine that can be accepted for a limited length of time without significant degradation, this takeoff rating being defined by a maximum takeoff power (TOP) and a duration for which this maximum takeoff power can be used, which duration is generally of the order of five minutes;

a maximum continuous power rating, which is defined by a maximum continuous power (MCP) that corresponds to about 90% of the maximum takeoff power TOP and by a duration for using this maximum continuous power that is generally unlimited;

an extended power rating, which rating is defined by an extended power that is substantially equivalent to or even equal to the maximum takeoff power TOP and by a duration for using this extended power that is of the order of thirty minutes; and a transient rating bounded by regulation of the power plant defined by a maximum transient power MTP.

On a twin-engine rotorcraft, the operating envelope also covers various contingency ratings that are used only when one of the two engines has failed. A rotorcraft engine can then operate at at least one of the following contingency ratings:

a first contingency rating, which is a super-contingency rating being defined by a power that is often equal to 112% to 120% of the maximum takeoff power TOP and by a duration for using this super-contingency rating that is generally of the order of thirty consecutive seconds at most, with the super-contingency power conventionally being usable three times during a single flight, this rating is referred to as "one engine inoperative, thirty seconds or "OEI 30" for short;

a second contingency rating sometimes referred to as "OEI 2'", this second contingency rating being defined by a maximum contingency power equal to about 105% to 110% of the maximum takeoff power TOP and by a duration of use for this OEI 2' rating that is of the order of two consecutive minutes at most; and a third contingency rating sometimes referred to as "OEI-cont", this third contingency rating being defined by an intermediate contingency power that is substantially equal to the maximum takeoff power TOP and by a duration of use that is unlimited at this intermediate contingency power for the remainder of the flight after the failure of one engine.

For each of the above-defined ratings, the engine manufacturer uses calculation or testing to draw up curves giving the power available from an engine as a function of altitude and as a function of outside temperature.

The engine manufacturer also determines limits for each engine enabling the MCP, TOP, MTP, OEI 30", OEI 2', and OEIcont powers to be obtained corresponding to each of the above-mentioned ratings and an acceptable flight time. On a turboshaft engine, these limits are generally monitored by means of three monitoring parameters: the speed of rotation of the gas generator of the engine; the drive torque; and the temperature of the gas at the inlet to the low pressure free turbine of the engine, which parameters are respectively labeled Ng, Cm, and T45 by the person skilled in the art. If the engine has a high pressure turbine stage, the temperature of the gas at the inlet to the high pressure turbine, written TET can also be used. This temperature TET of the gas at the inlet to the high pressure turbine is difficult to measure, and consequently is sometimes calculated from the temperature T45 of the gas at the inlet of the free turbine.

Thus, for each rating of the operating envelope of the engine, the manufacturer draws up limits for each monitoring parameter. These limits can vary as a function of outside conditions, namely outside pressure P0 and outside temperature T0 of the air outside the aircraft.

By way of example, for a single-engine aircraft, the manufacturer draws up:

first limits T4limTOP, T4limMCP, and T4limMTP corresponding to the temperature of the gas at the inlet of the low pressure free turbine of the engine when the engine is respectively developing maximum takeoff power, maximum continuous power, and maximum transient power, these first limits varying as a function of outside conditions;

second limits NGlimTOP, NGlimMCP, and NGlimMTP corresponding to the speed of rotation of the gas generator of the engine when the engine is respectively developing maximum takeoff power, maximum continuous power, and maximum transient power, these second limits varying as a function of outside conditions; and third limits TQMlimTOP, TQMlimMCP, and TQMlimMTP corresponding to the torque exerted on the outlet shaft of the engine when the engine is respectively developing maximum takeoff power, maximum continuous power, and maximum transient power, these third limits varying as a function of outside conditions.

The third limits may be measured by analogy using the torque exerted on the MGB at the inlet to the MGB and/or at its mast for driving the main rotor, for example.

By way of example, for a single-engine aircraft the manufacturer also determines fourth limits TQlimTOP, TQlimMCP, and TQlimMTP corresponding to the torque exerted at the MGB, e.g. on its mast for driving the main rotor, when the engine is respectively developing maximum takeoff power, maximum continuous power, and maximum transient power.

These various limits are drawn up by the manufacturers of the engine and of the aircraft, in the form of tables, of a database, or of equations, for example.

The pilot of a rotorcraft must then control the aircraft while taking into consideration the appropriate limits in order to comply with the recommendations of the engine manufacturer and protect the moving parts of the helicopter.

To this end, a rotorcraft has numerous instruments on the instrument panel, most of which instruments are representative of the operation of the power plant of the rotorcraft. For each monitoring parameter, the rotorcraft may have an indicator giving the current value of that monitoring parameter together with its limits. Such an indicator is referred to for convenience as an "individual indicator".

In order to facilitate piloting, an instrument is used solely for displaying information about the monitoring parameter that is the most limiting.

Document FR 2 749 545 relates to a piloting indicator presenting information about the monitoring parameter of an engine that is the closest to its limit value. The information about the limits to be complied with is thus combined in a single display making it possible firstly to provide a summary by presenting only the result of that summary in order to simplify the task of the pilot, and secondly to save room on the instrument panel. This produces a "limiting parameter" from among said monitoring parameters of the engine, which is the parameter having its current value that is the closest to the limit value for said parameter. That is why such an indicator is known as a first limitation instrument (FLI).

Other embodiments serve to display the value of the limiting parameter as a collective pitch margin for the blades of the main rotor of the rotorcraft.

For example, Document FR 2 756 256 suggests presenting on a display screen the power margin available for the power plant prior to reaching a limit on a scale graduated in equivalent collective pitch for the blades of the main rotor, which scale moves past an index representative of the current collective pitch of said blades. For example, the index may be in register with a first graduation, with the limit of the limiting parameter at a given power being in register with a second graduation higher than the first graduation. The pilot can then visualize the collective pitch margin that is available prior to reaching said given power.

In that document FR 2 756 256, the values of the monitoring parameters are determined at each calculation instant. The margin of each monitoring parameter relative to its limit parameter is then determined.

Thereafter, each margin of a monitoring parameter is converted into a power margin.

The smallest power margin is then selected and transformed into a collective pitch margin. The sum of this collective pitch margin plus the current collective pitch serves to obtain a collective pitch limit for display.

Such an indicator is very effective, in particular during stages of stabilized operation.

Nevertheless, during transient stages that may be said to be "dynamic", a pilot may operate the flight controls so as to cause the aircraft to maneuver quickly. During such dynamic stages, the indicator might momentarily supply collective pitch margins that are erroneous. By way of example, those collective pitch margins can be overestimated after the collective pitch of the blades of the main rotor have been increased rapidly, or underestimated after the collective pitch has been reduced rapidly.

Such a drawback is accepted by pilots, given that such rough dynamic stages are unusual.

Furthermore, the rotorcraft usually conserves the conventional individual indicators in addition to the first limitation indicator so as to enable each monitoring parameter taken in isolation to be monitored.

Documents FR 2 973 340, EP 2 518 582, and FR 2 809 082 are also known.

BRIEF SUMMARY OF THE INVENTION

An object of the present invention is to propose an alternative method and device for assisting piloting and seeking to achieve optimized accuracy.

The invention thus relates to a method of assisting the piloting of an aircraft, the aircraft being provided with a power plant having at least one engine and with a main rotor contributing at least in part to providing the aircraft with lift and/or propulsion, each engine being controlled by regulator means as a function of a setpoint, the power plant being monitored by determining values for a plurality of predetermined monitoring parameters, said aircraft being a rotorcraft.

For example, when the engine is a turboshaft engine, the monitoring parameters may include the speed of rotation of the gas generator of the engine, the driving torque of the engine, and the temperature of gas at the inlet to the low pressure free turbine of the engine. If the engine has a high pressure turbine stage, the temperature of the gas at the inlet of the high pressure turbine, written TET, may be used. When the power plant includes at least one main power transmission gearbox (MGB) connected to at least one engine and to the main rotor, the monitoring parameters may include a torque exerted in the MGB.

The collective pitch of the blades of the main rotor may be controlled by way of example by control means operable by a pilot, such as a lever, for example. The control means may be coupled to a force relationship. By way of example, the position of the control means makes it possible to evaluate the collective pitch of the blades of the main rotor.

For at least one operating rating of said at least one engine, the method comprises the following steps:

determining a power margin referred to as the "limiting" power margin of said power plant relative to a power limit at said operating rating;

transforming the limiting power margin into a collective pitch margin for said operating rating, the collective pitch margin representing the margin between a current collective pitch of the blades of said main rotor and a collective pitch limit of said blades of the main rotor; and determining said collective pitch limit and displaying said collective pitch limit.

By way of example, the teaching of Document FR 2 756 256 can be used for determining the limiting power margin and for determining the collective pitch limit on the basis of the collective pitch margin.

Furthermore, the collective pitch margin is determined by applying an algorithm that reduces the collective pitch margin relative to a real collective pitch margin, at the operating rating, proportional to the limiting power margin when the power margin is not zero in order to anticipate regulator means of said engine overshooting said setpoint, said collective pitch margin being zero when the limiting power margin is zero.

During a dynamic transient stage, a pilot may move the control means for controlling the collective pitch of the blades of the main rotor quickly in order to make use of the entire displayed collective pitch margin.

The regulator means control the flow rate of fuel transmitted to the engine accordingly. Nevertheless and by way of example, if the pilot maneuvers quickly, the engine runs the risk of overshooting one of its limits for a short time prior to reaching the required power.

The invention tends to avoid such a transient overshoot by reducing the displayed collective pitch margin relative to the real collective pitch margin that is, in fact, available, at least so long as the limiting power margin is not zero.

Under such circumstances, the term "collective pitch margin" refers to the collective pitch margin used for determining the displayed collective pitch limit. In contrast, the term "real collective pitch margin" refers to the collective pitch margin that is, in fact, available.

For example, the limiting power margin is transformed into a reduced power margin that is transformed into the collective pitch margin.

In another alternative, the limiting power margin is transformed into a real collective pitch margin, and it is the real collective pitch margin that is reduced in order to obtain the collective pitch margin.

In another alternative, the limiting pitch margin is transformed directly into the collective pitch margin.

By way of example, the collective pitch margin is determined by applying a recursive algorithm using a main relationship supplying the collective pitch margin at each current calculation instant as a function of a quotient of the limiting power margin divided by a denominator, the denominator being equal to the product of a first term multiplied by a second term, the first term being a function of the current collective pitch of said blades at said current calculation instant, and of a collective pitch limit at a previous calculation instant prior to said current calculation instant, said second term being a function of at least one predetermined coefficient reducing said power margin of the power plant.

Some of the prior art suggests that the collective pitch margin for the blades of the main rotor should be equal to the product of the power margin multiplied by an invariable constant.

On the contrary, the above-described method suggests making use of a recursive algorithm based on the following relationship:

$$\Delta\theta = \frac{\Delta Wlim}{A1(\theta_{limit}^{n-1}, \theta^n) * A2(B)}$$

where "$\Delta\theta$" represents the collective pitch margin, "$\Delta Wlim$" represents the limiting power margin, "$A1(\theta_{limit}^{n-1},\theta^n)$" represents the first term that is a function of the current collective pitch "$\theta^n$" at said current calculation instant and of the collective pitch limit "$\theta_{limit}^{n-1}$" at the calculation instant immediately before said current calculation instant, "$A2(B)$" represents the second term that is a function of at least one predetermined coefficient B for reducing said power margin of the power plant.

This algorithm is thus based on a factorized expression of the collective pitch margin including the limiting power margin as a common factor.

This algorithm seeks to ensure that a zero collective pitch margin gives rise to a zero power margin, and vice versa.

Under such circumstances, the collective pitch margin is added to the current collective pitch in order to give a collective pitch limit that is displayed on a screen, for example.

The calculated collective pitch margin thus depends on a coefficient that tends to reduce this collective pitch margin. The coefficient B is determined by testing and it is selected so as to ensure that reduced collective pitch margins are calculated in such a manner that the limits of the power plant are always complied with when maneuvers are performed by the crew.

Under such circumstances, the method tends to calculate an optimized collective pitch margin.

The optimized accuracy of the collective pitch limit as finally obtained can tend to make the individual indicators of the prior art pointless, if necessary by applying the variants described below. Specifically, the method can take account of variation in the speed of rotation of the main rotor by means of a power penalty that is applied to the limiting power margin, by means of the influence of an auxiliary rotor, or by means of variation in the speed of advance of the aircraft.

Under such circumstances, the method may optionally be implemented on an aircraft that tends to make use of so-called "part-time" display technology.

When the method enables accurate collective pitch margin information to be obtained throughout the flight field, the individual indicators need no longer necessarily be continuously visible. The information supplied by such individual indicators can then appear on a screen only on request for supplying various types of data, but not continuously.

Furthermore, the method may be used for determining a collective pitch limit for various operating ratings of the engines, it being possible for at least two distinct collective pitch limits to be displayed simultaneously. The teaching of Document FR 2 756 256 may be used.

The method may also include one or more of the following characteristics.

Thus, in order to determine the limiting power margin, the method may include the following steps:

determining a margin referred to as the "individual" margin for each monitoring parameter; and transforming each individual margin into a power margin referred to as the "individual" power margin, said limiting power margin being equal to the smallest individual power margin.

Optionally, the individual power margins or indeed the limiting margin are supplied by the regulator means of the engine. Such regulator means are sometimes known under the acronym "FADEC".

Furthermore, the first term may be determined using the following relationship:

$$A1 = \theta_{limit}^{n-1} + \theta^n - 2*\theta_0$$

where "$A1$" represents said first term, "$\theta_{limit}^{n-1}$" represents the collective pitch limit at the previous calculation instant prior to the current calculation instant, "$\theta^n$" represents said current collective pitch, "$\theta_0$" represents a constant relating to a reference collective pitch, "=" represents the equals sign, "+" represents the addition sign, "−" represents the subtraction sign, and "*" represents the multiplication sign.

The constant $\theta_0$ relating to a reference collective pitch may be invariable and it may be determined by testing so that the recursive algorithm converges.

In addition, the second term may be determined using the following relationship:

$$A2 = B*\sigma*Nr^3$$

where "A2" represents the second term, "B" represents said coefficient, "σ" represents the relative density of the air, "Nr" represents a parameter relating to the speed of rotation of the main rotor, and "*" represents the multiplication sign.

The relative density of the air is determined using the following formula:

$$\sigma = \frac{Pco}{Tco}$$

with:

$$Pco = \frac{P0}{1013.25}$$

$$Tco = \frac{OAT + 273.15}{288.15}$$

where "P0" represents the outside pressure expressed in millibars (mBar), and "OAT" represents the outside air temperature expressed in degrees Celsius.

The parameter Nr relating to the speed of rotation of the main rotor may be a fixed constant. In particular, the main rotor may be associated with a nominal speed of rotation, the speed of rotation of the main rotor being caused to tend towards this nominal speed of rotation. In this configuration, the parameter Nr is equal to the value of the nominal speed of rotation.

On another type of aircraft, the rotor may be associated with a nominal speed of rotation that varies as a function of the stage of flight. Under such circumstances, the parameter Nr may be equal to the value of the nominal speed of rotation that corresponds to the current stage of flight.

In another variant, the method of the invention makes provision to measure a speed of rotation that is at least proportional to the speed of rotation of the rotor. For example, the parameter Nr at each calculation instant is equal to the measured value of the speed of rotation of the main rotor, or indeed to the product of a proportionality constant multiplied by the measured value of the speed of rotation of a member that drives rotation of the main rotor directly or indirectly.

Furthermore, the relative density "σ" may be corrected in flight using known relationships as a function of the outside pressure and the outside temperature of the air present outside the aircraft.

Specifically, the Applicant observes that the collective pitch is associated with the power developed by the power plant in stabilized flight by the following equation:

$$\frac{W}{\sigma * Nr^3} = A + B * (\theta - \theta_0)^2$$

where "W" represents said power, "σ" represents the relative density of the air, "Nr" represents a parameter relating to the speed of rotation of the main rotor, "θ" represents the current collective pitch, and "$\theta_0$" represents a constant relating to a reference collective pitch.

This relationship is determined empirically by testing in flight.

The Applicant deduces therefrom the following relationship between a collective pitch limit and a power limit:

$$\frac{W_{limit}}{\sigma * Nr^3} = A + B * (\theta_{lim} - \theta_0)^2$$

where "$W_{limit}$" represents the power limit, "σ" represents the relative density of the air, "Nr" represents a parameter relating to the speed of rotation of the main rotor, "$\theta_{lim}$" represents the collective pitch limit, and "$\theta_0$" represents the constant relating to a reference collective pitch.

The following relationship between the current collective pitch $\theta_{meas}$ and the current power $W_{meas}$ is deduced therefrom:

$$\frac{W_{meas}}{\sigma * Nr^3} = A + B * (\theta_{meas} - \theta_0)^2$$

Under such circumstances, the power margin and the collective pitch margin are associated by the following relationship:

$$\frac{\Delta W}{\sigma * Nr^3} = B * [(\theta_{lim} - \theta_0)^2 - (\theta_{meas} - \theta_0)^2]$$

i.e.:

$$\Delta \theta = \frac{\Delta Wlim}{B * (\theta_{lim} + \theta_{meas} - 2\theta_0)\sigma * Nr^3}$$

where "Δθ" represents the collective pitch margin, "ΔWlim" represents the limiting power margin, "$\theta_{lim}$" represents the collective pitch limit, "$\theta_{meas}$" represents the current collective pitch, "σ" represents the relative density of the air, "Nr" represents a parameter relating to the speed of rotation of the main rotor, and "$\theta_0$" represents the constant relating to the reference collective pitch.

By applying a recursive algorithm, the following series is thus obtained:

$$\theta_{limit}^n - \theta^n = \Delta\theta_{limit}^n = \frac{W_{margin}^n}{B * (\theta_{limit}^{n-1} + \theta^n - 2\theta_0)\sigma * Nr^3}$$

where "$\theta_{limit}^n$" represents the collective pitch limit at the current calculation instant, "$\theta_{limit}^{n-1}$" represents the collective pitch limit at the calculation instant previous to the current calculation instant, "$\theta^n$" represents said current collective pitch, "$\Delta\theta_{limit}^n$" represents the collective pitch margin at the current calculation instant, "$W_{margin}^n$" represents the limiting power margin at the current calculation instant, "$\theta_0$" represents a constant relating to a reference collective pitch, "σ" represents the relative density of the air, and "Nr" represents a parameter relating to the speed of rotation of the main rotor.

Furthermore, said coefficient B may be a dimensionless variable that varies as a function of the speed of advance of the aircraft.

In particular, the coefficient B may vary as a function of a speed of advance of the aircraft divided by a reference speed. The speed of advance may be the speed known as "indicated air speed" and referred to by the acronym IAS.

In order to determine the values of the coefficient B, it is possible to perform steady level flights. For example the coefficient B is equal to 6.25 with a speed of advance of 150 knots (kt), to 7 with a speed of advance of 70 kt, and to 8.2 with a speed of advance of 40 kt.

Optionally, prior to transforming the limiting power margin into a collective pitch margin, the limiting power margin is reduced by a predetermined percentage if the speed of rotation of the main rotor decreases at a predetermined rate during a predetermined time.

The method of the invention makes provision for transforming a power margin into a collective pitch margin, e.g. by using a recursive algorithm.

The recursive algorithm gives good results during stabilized stages of flight, and indeed during dynamic stages of flight with an engine that is well controlled.

When a pilot changes the collective pitch of the blades of the main rotor in aggressive manner, the speed of rotation of the main rotor can decrease. Following this reduction in the speed of rotation of the main rotor, the engine accelerates in order to maintain the speed of rotation of the main rotor equal to a setpoint.

If the engine is regulated in relatively inaccurate manner, the engine accelerates by consuming more power than predicted by the calculation models. This phenomenon is very fast and the pilot needs to be informed as soon as possible that there is a risk of overshooting a limit. In order to anticipate this acceleration of the engine, an algorithm for detecting the reduction in the speed of rotation of the main rotor is used in order to determine whether a preventative correction of the collective pitch limit indicated by the indicator needs to be applied.

A first order filter may be applied to the speed of rotation of the main rotor in order to calculate its variation.

If the speed of rotation of the rotor decreases with variation greater than the predetermined rate, then a digressive penalty is applied during the predetermined time. For example, the predetermined rate corresponds to 4% of a reference speed per second, the predetermined time being equal to 0.5 seconds (s).

This additional characteristic tends to improve the accuracy of the collective pitch limit.

Furthermore, the percentage applied to reduce the limiting power margin may decrease from a maximum to a zero value over a predetermined duration.

For example, the penalty that is applied is equivalent to a 25% reduction of the limiting power margin, and it is applied degressively or linearly so as to become zero after 2 s.

Furthermore, during a predetermined aggressive stage of flight of the aircraft, the method may include a freezing step during which the collective pitch limit is kept equal to the value of said collective pitch limit as reached before said aggressive stage of flight.

The term "before said aggressive stage of flight" means the calculation instant previous the beginning of the aggressive stage of flight.

During an aggressive stage of flight, the collective pitch limit runs the risk of being falsely maximized because of the reaction time of the engine following a command given to vary the pitch of the blades of the main rotor.

In order to avoid displaying a collective pitch limit that is greater than the collective pitch limit that is actually reached at the end of the maneuver, e.g. following a rapid increase in the collective pitch of the blades of the main rotor, this additional characteristic proposes freezing the value of the collective pitch limit during the dynamic stage of flight.

An aggressive stage of flight is optionally detected:

if the collective pitch of the blades of the main rotor varies at a rate greater than a predetermined high rate of variation threshold; or if the collective pitch of the blades of the main rotor varies at a rate lying between a predetermined low rate of variation threshold and said high rate of variation threshold during a duration threshold; or if a variation in the speed of rotation of said main rotor is greater than a low threshold and if a control member controlling the pitch of blades of an auxiliary rotor is not operated; or if the variation in the speed of rotation of said rotor is greater than a high threshold and if said control member controlling the pitch of the blades of an auxiliary rotor is operated.

The above-explained relationship between collective pitch and power can be particularly accurate during a stabilized stage of flight.

During a transient stage, this relationship can be less accurate. In order to avoid misleading a pilot, the collective pitch limit is then frozen during transient stages.

For example, a transient stage is a very aggressive dynamic stage of flight during which the collective pitch of the blades of the main rotor varies at a rate greater than the high rate of variation threshold. By way of example, a high rate of variation threshold is equal to 1.6° per second.

The variation in the collective pitch of the main rotor may be determined by applying a first order filter.

In addition, a transient stage is an aggressive dynamic stage of flight when the collective pitch of the blades of the main rotor lies between a low rate of variation threshold and the high rate of variation threshold for a duration threshold. By way of example, such a low rate of variation threshold is less than the high rate of variation threshold and equal to 0.4° per second, with the duration threshold being equal to 800 milliseconds (ms).

Furthermore, the low threshold may for example be equal to one percent of a nominal speed of the main rotor per second, and the high threshold may be equal to three percent of the nominal speed of the main rotor per second. The low threshold is less than the high threshold.

Furthermore, the freezing step may be inhibited if a position of a control member controlling the pitch of the blades of an auxiliary rotor varies at a travel speed greater than a threshold travel speed.

By way of example, such a control member may be a pedal set.

During rapid variation of the position of the control member in order to perform a "spot turn" maneuver, the power available for driving the main rotor varies rapidly.

Under such circumstances, this additional characteristic proposes inhibiting the freezing of collective pitch limits in order to enable these limits to be updated rapidly.

Optionally, the freezing step is not inhibited if a position of a control member controlling the pitch of the blades of an auxiliary rotor varies at a travel speed greater than a travel threshold and if the collective pitch of the blades of the main rotor varies at a rate greater than the predetermined high rate of variation threshold.

Furthermore, prior to displaying the collective pitch limit, the method may include a filtering step, the collective pitch limit being determined at a current calculation instant by applying the following filter:

$$\theta^n_{limdef} = (1-f) * \theta^{n-1}_{limitdef} + f * \theta^n_{limit}$$

where "$\theta^n_{limdef}$" represents the collective pitch limit at the end of the filtering step, "$\theta^{n-1}_{limitdef}$" represents the filtered collective pitch limit at the previous calculation instant prior to the current calculation instant, "$\theta_{limit}{'''}$" represents the collective pitch limit determined before the filtering step, "f" represents a filtering constant, "=" represents the equals sign, "+" represents the addition sign, "−" represents the subtraction sign, and "*" represents the multiplication sign.

The filtering constant "f" has the purpose of eliminating noise coming from the calculation parameters in order to guarantee that the collective pitch limit is displayed in stable manner. The filtering constant may be a constant as such, or it may vary as a function of the stage of flight.

Furthermore, the time constant of this lowpass first order filter is determined on the basis of analyzing input parameters and it may be set to lie in the range 0.5 s to 2 s.

In particular, the freezing step may be performed by giving the filter constant f a value of zero (i.e. a filtering time constant that is infinite).

The filter is then used also for managing dynamic stages in which the limits are frozen. However, during other stages of flight where, on the contrary, it is necessary to update the limits rapidly, the filtering constant f is set at a predetermined value.

Furthermore, on passing from a predetermined aggressive stage of flight of the aircraft to a "stabilized" stage of flight, said filter is applied for a predetermined duration with a filtering constant equal to a predetermined filtering constant for application during the stabilized stage of flight divided by four.

On passing from an aggressive stage of flight to a stabilized stage of flight, such a variable time constant tends to avoid any jumping of the limit.

Furthermore, the value of the filtering constant may be a function of a "control member" variable, referenced Fpal, the control member variable varying as a function of a travel speed of a control member controlling the pitch of the blades of an auxiliary rotor.

Each collective pitch limit may then be filtered during a static stage of flight, and it may optionally be frozen during certain dynamic stages of flight.

During a rapid variation of the position of the control member, it can be advantageous for updating to be rapid.

The following first order filter may be applied to the position of the control member in order to calculate its variation:

$$DYaw = g*prevDYaw + (1-g)*(currentYawpos - prevYawpos)$$

where "DYaw" represents the variation in the position of the control member at the current calculation instant expressed as percentage per second, "g" represents a constant of the filter, "prevDYaw" represents the variation in the position of the control member at the previous calculation instant, "currentYawpos" represents the position of the control member at the current calculation instant, and "prevYawpos" represents the current position of the control member at the previous calculation instant.

In order to update the filtering, an algorithm calculating the variation in the position of the control member is used. The variation in the position of the control member makes it possible to update the filtering constant in real time and thus to update the collective pitch limits more rapidly, should that be necessary. The greater the variation in the position of the control member, the greater the corresponding variation of power. The collective pitch limits are updated by filtering the display of these collective pitch limits as little as possible by means of a suitable filtering coefficient.

Thus, the control member variable is calculated on the basis of the variation in the position of the control member in application of a predetermined relationship. For example, such a relationship may be a function of a maximum authorized filtering threshold, and of maximum and minimum variations in the position of the control member.

In a variant, the control member variable Fpal may be equal to a value that is calculated using the following relationship:

$$[Min(yaw\_decel\_max,(Max(DYaw,yaw\_decel\_min)))]*Yaw\_A+Yaw\_B$$

with $$Yaw\_A=(yaw\_filt\_coef\_max-1)/(yaw\_decel\_max-yaw\_decel\_min)$$

$$Yaw\_B=1-(Yaw\_A*yaw\_decel\_min)$$

where "Min" represents the minimum of two values, "Max" represents the maximum of two values, "DYaw" represents the variation in the position of the control member at the current calculation instant, "yaw_decel_min" represents a constant, e.g. equal to 4.0, "yaw_filt_coef_max" represents a constant, e.g. equal to 10.0, "yaw_decel_max" represents a constant, e.g. equal to 8.0, "/" represents the division sign, and "*" represents the multiplication sign.

This filtering may have priority over the freezing step.

Furthermore, the value of the filtering constant is also a function of a value of a variable referred to as the "advance" variable, written Fvit, the advance variable varying as a function of a speed of advance of the aircraft.

The following first order filter may be applied to the speed of advance in order to calculate its variation:

$$Delta\_IAS=h*prevDelta\_IAS+(1-h)*(current\_IAS-prev\_IAS)$$

where "Delta_IAS" represents the variation in the speed of advance at the current calculation instant expressed in knots per second, "h" represents a constant of the filter, "prevDelta_IAS" represents the variation in the speed of advance at the previous calculation instant, "current_IAS" represents the speed of advance at the current calculation instant, and "prev_IAS" represents the speed of advance at the previous calculation instant.

In order to update the filtering performed, use is made of an algorithm calculating the variation in the speed of advance of the aircraft.

The variation in the speed of the aircraft makes it possible to update the filtering constant in real time, and thus to update the indicator more rapidly, where necessary.

Thus, the filtering constant is calculated on the basis of a predetermined relationship. For example, such a relationship is a function of a maximum authorized filtering threshold, and of maximum and minimum variations of the speed of advance.

In a variant, the advance variable Fvit is equal to 1 if the speed of advance is less than a threshold (e.g. 40 kt). Otherwise, the advance variable Fvit may be equal to a value as calculated using the following relationship:

if Delta_IAS is positive:

$$[Max(IAS\_decel\_max,(min(Delta\_IAS,IAS\_decel\_min)))]*IAS\_A+IAS\_B;$$

If Delta_IAS is negative:

$$[Min(-IAS\_decel\_max,(Max(Delta\_IAS,IAS\_decel\_min)))]*IAS\_A+IAS\_B;$$

with:

$$IAS\_A = (IAS\_filt\_coef\_max - 1)/(IAS\_decel\_max - IAS\_decel\_min);$$

$$[IAS\_B = 1 - (IAS\_A * IAS\_decel\_min)$$

where "Min" represents the minimum of two values, "Max" represents the maximum of two values, "Delta_IAS" represents the variation in the speed of advance at the current calculation instant, "IAS_decel_min" represents a constant, e.g. equal to −0.5, "IAS_filt_coef_max" represents a constant, e.g. equal to 2.5, "IAS_decel_max" represents a constant, e.g. equal to −1, "IAS_decel_min" represents a constant, e.g. equal to −0.5, "/" represents the division sign, and "*" represents the multiplication sign.

In a variant, the value of the filtering constant is equal to the product of a predetermined constant CTE multiplied by the greater of the advance variable (Fvit) and the control member variable (Fpal). The predetermined constant CTE may be equal to 0.02, for example.

The filtering constant is thus deduced from the following conditions:

$$f = CTE * Max(Fpal, Fvit)$$

where "f" represents the value of the filtering constant, "Max(Fpal, Fvit)" represents the maximum between the value of the control member variable Fpal and the value of the advance variable Fvit.

In addition to a method, the invention provides a piloting assistance device including a display displaying the collective pitch limit.

The piloting assistance device includes a processor unit configured to apply the method.

The piloting assistance device may include at least one of the following members:

a regulator system controlling each engine, such as a FADEC, for example;

a measurement system measuring a parameter relating to a collective pitch of blades of the main rotor, e.g. a system measuring the position of a mechanical member such as a collective pitch control lever or a servo-control or indeed a connecting rod;

a measurement system measuring a parameter relating to a current speed of rotation of the main rotor, e.g. a system measuring the speed of rotation of a rotor mast or of a rotary member driving rotation of the rotor;

a measurement system measuring a value relating to each monitoring parameter, such as a FADEC, for example;

a measurement system measuring a value relating to the pressure of ambient air present outside the aircraft, such as a pressure sensor or an air data computer, for example;

a measurement system measuring a value relating to the temperature of ambient air present outside the aircraft such as a thermometer or a temperature probe, for example;

a measurement system measuring a value relating to a speed of advance of the aircraft such as an air data computer or a satellite positioning system, for example; and a measurement system measuring a value relating to a position of a control member controlling the pitch of the blades of an auxiliary rotor of the aircraft, such as a conventional position sensor.

Finally, the invention provides an aircraft having a power plant including at least one engine and a main rotor contributing to providing the aircraft with at least part of its lift and/or propulsion, the aircraft including such a piloting assistance device.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
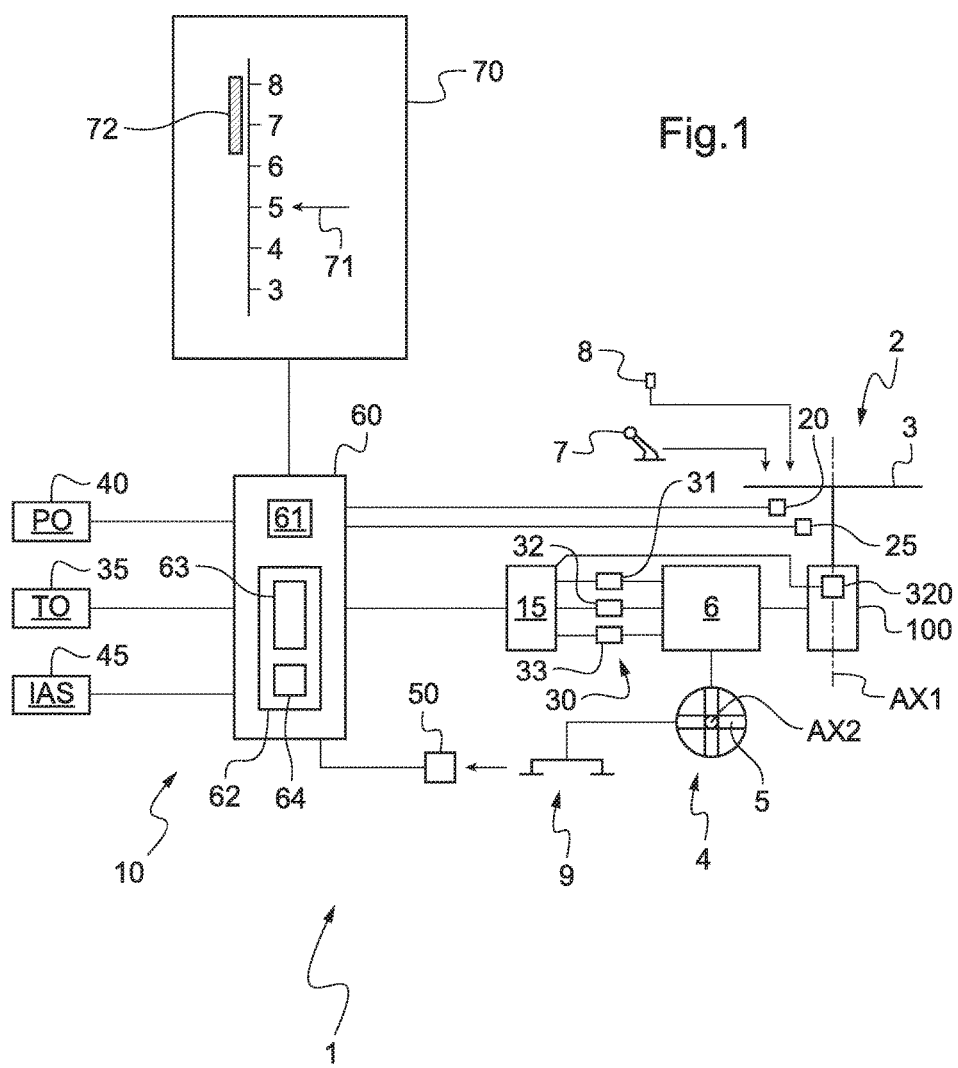
FIG. 1 is a diagram showing an aircraft of the invention.

FIG. 1 shows an aircraft 1 of the invention.

The aircraft has at least one main rotor 2 provided with a plurality of blades 3. The main rotor contributes at least to providing the aircraft 1 with lift and possibly also with propulsion.

Furthermore, the aircraft 1 may include an auxiliary rotor 4 having blades 5. The auxiliary rotor serves at least to contribute to controlling yaw movement of the aircraft 1.

Under such circumstances, the main rotor 2 and the auxiliary rotor 4 are free to rotate relative to the air frame of the aircraft 1 about two respective non-parallel axes of rotation. By way of example, the main rotor 2 rotates about an axis in elevation AX1, while the auxiliary rotor 4 rotates about a transverse axis AX2.

In order to generate rotation of the main rotor 2 and rotation of the auxiliary rotor 4, the aircraft 1 has a power plant with at least one engine 6. The engine 6 may be mechanically connected to the main rotor 2 by a main gearbox 100 for transmitting power. In addition, the engine 6 may be mechanically connected to the auxiliary rotor 4 via the MGB 100 and/or an auxiliary gearbox (not shown).

By way of example, the engine 6 may be a fuel burning engine or it may be an electric motor.

Each engine may be regulated by regulator and control means 15 sometimes referred to by the acronym "FADEC". The regulator and control means 15 may include a fuel metering system for a fuel burning engine together with a unit controlling the fuel metering system as a function of monitoring parameters of the engine or indeed of the MGB, and as a function of setpoints.

With a turboshaft engine, these monitoring parameters may include the speed of rotation Ng of the gas generator of the engine measured by a speed sensor 31, the driving torque Q measured by a torque meter 32, and a temperature measured by a temperature sensor 33. For example it may be the temperature T4 or the temperature T45 of gas at the inlet of a low pressure free turbine of the engine that is measured.

These monitoring parameters may also include a torque C exerted within the MGB, in particular on a shaft of the MGB, such as a rotor mast. The aircraft may then include means for monitoring the torque C in the MGB 100 as measured by a torque meter 320.

Reference may be made to the literature in order to obtain additional information about the monitoring parameters of a power plant and their measurement systems 30.

Furthermore, the aircraft 1 has means for controlling the pitch of the blades of the main rotor and of the blades of the auxiliary rotor. Thus, the collective pitch of the blades 3 of the main rotor may be controlled by a collective pitch lever 7, with the cyclic pitch of the blades 3 of the main rotor being controlled by a cyclic stick 8. The collective pitch of the blades 5 of the auxiliary rotor 4 may be controlled by a control member 9, such as pedals, for example.

In addition, the aircraft 1 has a device 10 of the invention for providing assistance in piloting.

The piloting assistance device 10 is provided with a processor unit 60 that is configured to perform the method of the invention.

By way of example, the processor unit 60 may comprise a processor, an integrated circuit, a programmable system, a logic circuit, these examples not limiting the scope to be given to the term "processor unit".

In the example of FIG. 1, the processor unit 60 has a calculation unit 61. For example, the calculation unit 61 has at least one processor.

In addition, the processor unit 60 possesses a storage unit 62. For example, the storage unit 62 is provided with one or more optionally removable memories. Such a memory may be in the form of a hard disk, a removable memory card, . . . . The storage unit 62 may in particular possess a non-volatile memory 63 storing instructions executable by the calculation unit in order to perform steps of the method of the invention, and indeed a volatile memory 64 that stores the measured data that is useful for executing said method.

The processor unit may then be connected via a wired or wireless connection to various measurement systems, and for example to: a measurement system 20 measuring a parameter relating to the collective pitch of the blades 3 of the main rotor 2, such as for example the position of a member of a collective pitch control linkage; a measurement system 25 measuring a parameter relating to a current speed of rotation of the main rotor 2; a measurement system measuring a respective value relating to each monitoring parameter; a measurement system 35 measuring a value relating to the temperature T0 of ambient air present outside the aircraft 1; a measurement system 40 measuring a value relating to the pressure P0 of ambient air present outside the aircraft 1; a measurement system 45 measuring a value relating to a speed of advance IAS of the aircraft 1; and a measurement system 50 measuring a value relating to a position of the control member 9 controlling the pitch of the blades of the auxiliary rotor 4.

The processor unit 60 may optionally communicate with a regulator system 15 controlling an engine 6, in order to obtain the current values of the monitoring parameters or indeed a margin for each monitoring parameter relative to at least one limit or indeed a limiting power margin.

Under such circumstances, the processor unit can store in its storage unit data coming from the measurement systems. The processor unit then executes the steps of the method of the invention in order to obtain at least one collective pitch limit for the main rotor, and possibly a collective pitch limit for the main rotor in at least two operating ratings of the engine 6.

In addition, the processor unit is connected via a wired or wireless connection to a display 70 for displaying each collective pitch limit on the display.

Under such circumstances, the display 70 may possess a screen having a scale graduated in equivalent collective pitch that moves past an index 71. The index 71 then points to the scale to inform a pilot of a current collective pitch value of the blades of the main rotor. Furthermore, at least one symbol 72 representing a collective pitch limit is displayed.

By way of example, it is possible to use the symbology of Document FR 2 756 256.

Figure 2:
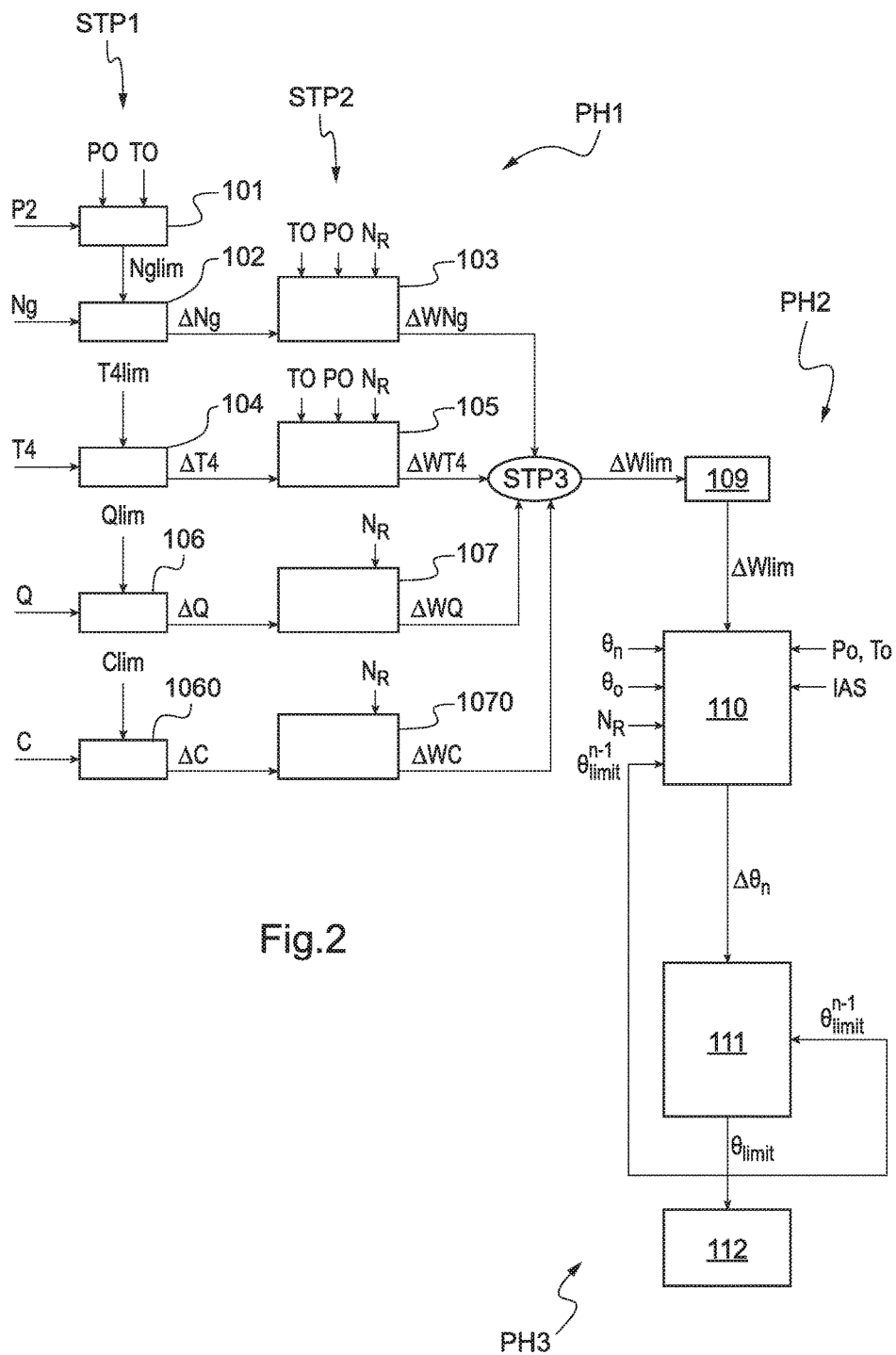
FIG. 2 is a flow chart showing the method of the invention.

FIG. 2 is a flow chart explaining the method performed by the piloting assistance device in order to determine a collective pitch limit.

During a first stage PH1, the piloting assistance device determines a limiting power margin $\Delta$Wlim for the power plant.

This limiting power measure $\Delta$Wlim may be determined by the regulator and control means 15 of the engine 6, and then transmitted to the processor unit 60.

In another variant, and during a first step STP1 of the first stage PH1, the processor unit determines a margin referred to as the "individual" margin $\Delta$Ng, $\Delta$t4, $\Delta$Q, and $\Delta$C respectively for each of the monitoring parameters Ng, T4, Q, and C.

By way of example, the processor unit applies a mathematical model 101 of the engine in order to determine a limit for the speed of rotation of the gas generator Nglim, e.g. as a function of a gas takeoff P2 from the engine, of an outside pressure P0, and of an outside temperature T0. The processor unit then takes a difference 102 between said limit Nglim for the speed of rotation of the gas generator and the current speed of rotation Ng of the gas generator in order to obtain a first individual margin $\Delta$Ng for the speed of rotation of the gas generator.

The mathematical model of the engine may also provide a temperature limit T4lim for the engine and a torque limit Qlim. The processor unit then takes a difference 104 between the temperature limit T4lim and the current temperature T4 in order to obtain a second individual margin $\Delta$t4 concerning temperature. Likewise, the processor unit takes a difference 106 between the torque limit Qlim and the current torque Q of the engine in order to obtain a third individual margin $\Delta$Q concerning torque. Optionally, the processor unit takes a difference 1060 between the torque limit Clim and the current torque C in the MGB in order to obtain a fourth individual margin $\Delta$C concerning torque.

During a second step STP2 of the first stage PH1, the processor unit transforms each individual margin $\Delta$Ng, $\Delta$t4, $\Delta$Q, and $\Delta$C into a respective power margin for the engine referred to as the "individual" power margin $\Delta$WNg, $\Delta$Wt4, $\Delta$WQ, and $\Delta$WC, by applying the usual mathematical models.

By way of example and during a first operation 103, the processor unit transforms the first individual margin $\Delta$Ng into a first individual power margin $\Delta$WNg, as a function in particular of the outside pressure P0 and of the outside temperature T0 and of the speed of rotation Nr of the main rotor.

During a second operation 105, the processor unit can transform the second individual margin $\Delta$t4 into a second individual power margin $\Delta$Wt4 as a function in particular of the outside pressure P0 and of the outside temperature T0 and the speed of rotation Nr of the main rotor.

During a third operation 107, the processor unit can transform the third individual margin $\Delta$Q into a third individual power margin $\Delta$WQ as a function in particular of the speed of rotation Nr of the main rotor.

Optionally, during a fourth operation 1070, the processor unit can transform the fourth individual margin $\Delta$C into a fourth individual power margin $\Delta$WQ as a function in particular of the speed of rotation Nr of the main rotor.

Thereafter, and during a third step STP3 of the first stage PH1, the processor unit determines the limiting power margin $\Delta$Wlim. The limiting power margin $\Delta$Wlim is equal to the smallest individual power margin. In the example of FIG. 2, the limiting power margin $\Delta$Wlim is equal to the smallest value among the first individual power margin ΔWNg, the second individual power margin ΔWt4, and the third individual power margin ΔWQ, and possibly also the fourth individual power margin ΔWC.

During a second stage PH2, the processor unit 60 transforms the limiting power margin ΔWlim into a collective pitch margin Δθn representing the margin between a current collective pitch θn of the blades of the main rotor and a collective pitch limit $\theta_{limit}$.

During an optional first step 109 of the second stage PH2, the processor unit 60 reduces the limiting power margin ΔWlim by a predetermined percentage if the speed of rotation Nr of the main rotor 2 drops at a predetermined rate during a predetermined time.

The reduction in question may be temporary. For example, the reduction percentage applied to the limiting power margin ΔWlim decreases from a maximum to a zero value over a predetermined period. For example this percentage may decrease from 25% to zero in two seconds.

During a second step 110 of the second stage PH2, the processor unit determines at each current calculation instant n̲ a collective pitch margin Δθn for the blades of the main rotor.

For this purpose, the processor unit applies an algorithm that decreases the collective pitch margin Δθn relative to the real collective pitch margin by an amount proportional to the limiting power margin ΔWlim when the power margin is not zero in order to anticipate said regulator means overshooting said setpoint. The collective pitch margin Δθn is zero when the limiting power margin ΔWlim is zero.

By way of example, the processor unit applies a recursive algorithm using a main relationship that provides the collective pitch margin Δθn at each current calculation instant. In particular, the main relationship expresses the collective pitch margin Δθn as a function of the quotient of the limiting power margin ΔWlim divided by a denominator, the denominator being equal to the product of a first term A1 multiplied by a second term A2. The first term A1 is also a function of the current collective pitch $\theta^n$ of the blades of the main rotor and of the collective pitch limit $\theta_{limit}^{n-1}$ of the blades of the main rotor at a previous calculation instant n−1 prior to the current calculation instant n̲. The second term A2 is a function at least of a predetermined coefficient B for reducing the power margin of the power plant.

The main relationship then takes the following form:

$$\Delta\theta n = \frac{\Delta Wlim}{A1(\theta_{limit}^{n-1}, \theta^n) * A2(B)}$$

At the first iteration performed when starting the aircraft, the collective pitch limit $\theta_{limit}^{n-1}$ is initialized to a predetermined initialization value.

More precisely, the first term may have the following form:

$$A1 = \theta_{limit}^{n-1} + \theta^n - 2*\theta_0$$

where "A1" represents said first term, "$\theta_{limit}^{n-1}$" represents the collective pitch limit at the previous calculation instant prior to the current calculation instant, "$\theta^n$" represents the current collective pitch, "$\theta_0$" represents a constant relating to a reference collective pitch, "=" represents the equals sign, "+" represents the addition sign, "−" represents the subtraction sign, and "*" represents the multiplication sign.

In addition, the second term may take the following form:

$$A2 = B*\sigma*Nr^3$$

where "A2" represents said second term, "B" represents said coefficient, "σ" represents the relative density of the air, "Nr" represents a parameter relating to the speed of rotation of the main rotor, and "*" represents the multiplication sign.

Thereafter, the main relationship applied by the processor unit may take the following form:

$$\Delta\theta n = \frac{\Delta Wlim}{B*(\theta_{limit}^{n-1} + \theta^n - 2*\theta_0)*\sigma*Nr^3}$$

The coefficient B may be determined by testing performed by the manufacturer in order to reduce permanently the calculated collective pitch margin relative to the real collective pitch margin.

Consequently, the coefficient B may be a variable that varies as a function of the speed of advance IAS of the aircraft 1.

During a first step 111 of the third stage PH3, the processor unit 60 determines at each calculation instant the collective pitch limit $\theta_{limit}$ for the blades of the main rotor. This collective pitch limit $\theta_{limit}$ is equal to the sum of the collective pitch margin for the blades of the main rotor plus the current collective pitch of the blades of the main rotor.

During a second step 112, the processor unit causes the current collective pitch to be displayed together with the collective pitch limit $\theta_{limit}$.

Optionally, during the first step 111 of the third stage PH3, the processor unit has a filtering step. The processor unit then determines the collective pitch limit for the blades of the main rotor that is to be displayed at a current calculation instant by applying the following filter:

$$\theta_{limdef}^n = (1-f)*\theta_{limitdef}^{n-1} + f*\theta_{limit}^n$$

where "$\theta_{limdef}^n$" represents the collective pitch limit for the blades of the main rotor at the end of the filtering step, "$\theta_{limitdef}^{n-1}$" represents the collective pitch limit for the blades of the main rotor at the previous calculation instant prior to the current calculation instant, "$\theta_{limit}^n$" represents the collective pitch limit for the blades of the main rotor before the filtering step, "f" represents a filtering constant, "=" represents the equals sign, "+" represents the addition sign, "−" represents the subtraction sign, and "*" represents the multiplication sign.

Under such circumstances, the value of the collective pitch limit for the blades of the main rotor at the end of the filtering step is reused during the second step 110 of the second stage PH2 and the first step 111 of the third stage PH3 as performed at the following calculation instant.

Furthermore, the filtering constant f may be determined, e.g. by testing, and it may vary as a function of the stage of flight.

Optionally, the processor unit determines the value of the filtering constant as a function of the value of a variable referred to as the "control member" variable Fpal. This control member variable Fpal is a function of a travel speed of the control member 9 that controls the pitch of the blades 5 of the auxiliary rotor 4. For example, a predetermined relationship or a table of values gives the value of the control member variable Fpal as a function of the travel speed of the control member 9.

In alternative manner, or in addition, the processor unit 60 determines the value of the filtering constant f as a function of the value of a variable referred to as the "advance" variable Fvit. This advance variable Fvit is also a function of a speed of advance IAS of the aircraft 1. For example, a predetermined relationship or a table of values gives the value of the advance variable Fvit as a function of the speed of advance IAS.

Where appropriate, the value of the filtering constant is equal to the product of a predetermined constant multiplied by the greater of the advance variable Fvit and the control member variable Fpal.

Furthermore, the processor unit 60 can freeze the collective pitch limit by keeping it equal to the value of this collective pitch limit at the previous calculation step. In particular, the processor unit can freeze the collective pitch limit during a predetermined aggressive stage of flight of the aircraft 1.

A stage of flight may be considered as being an aggressive stage of flight:

if the collective pitch of the blades 3 of the main rotor 2 varies at a rate greater than a predetermined high variation rate threshold K1; or if the collective pitch of the blades 3 of the main rotor 2 varies at a rate lying between a predetermined low rate of variation threshold K0 and said high rate of variation threshold K1 for a duration threshold; or if the variation in the rate of rotation of said main rotor is greater than a low threshold K2 and if the control member 9 controlling the pitch of the blades 5 of the auxiliary rotor 4 is not operated; or if the variation in the rate of rotation of said main rotor is greater than a high threshold K3 and if the control member 9 is operated.

Nevertheless, the processor unit can inhibit the freezing step if the position of the control member 9 controlling the pitch of the blades 5 of an auxiliary rotor 4 varies at a travel speed greater than a travel speed threshold.

In contrast, the freezing step is optionally not inhibited if the position of the control member 9 controlling the pitch of the blades 5 of an auxiliary rotor 4 varies at a travel speed greater than a travel speed threshold and if the collective pitch of the blades 3 of the main rotor 2 varies at a rate greater than a predetermined high rate of variation threshold. In this very aggressive stage of flight, it is not possible to prohibit freezing of the limit.

The freezing step may be performed by keeping the limiting power margin constant or the collective pitch margin constant, for example.

In the example of FIG. 2, the processor unit 60 may give the filtering constant f a value of zero during an aggressive stage of flight.

The value of the filtering constant f may then vary during an aggressive stage of flight and/or as a function of the value of the control member variable Fpal or indeed of the value of the advance variable Fvit.

Furthermore, when passing from an "aggressive" stage of flight to a stabilized stage of flight, the filtering constant may be modified. For example, the filtering constant may be modified so that during a determined transition duration it is equal to the filtering constant for application in a stabilized stage of flight when divided by four.

The term "stabilized" stage of flight designates all stages of flight that are not considered as being aggressive.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

FIG. 2 is in particular a flow chart showing the method of the invention.

Nevertheless, the method may be implemented by applying alternative flow charts. For example, one such alternative flow chart could have two distinct branches, one branch comprising the steps to be performed during a stabilized stage of flight and another branch having the steps to be performed during a dynamic stage of flight. By way of example, a test may be performed after determining the limiting power margin in order to determine which branch to use.

What is claimed is:

1. A piloting assistance method for assisting the piloting of an aircraft having a power plant including at least one engine and a main rotor contributing to at least part of the lift and/or propulsion of the aircraft, the main rotor having blades, the aircraft being a rotorcraft, each engine being controlled by regulator means of the aircraft as a function of a setpoint, the power plant being monitored by at least one sensor determining values for a plurality of predetermined monitoring parameters, the method comprising the following steps for at least one operating rating of the at least one engine:

determining, by a processor of the aircraft in communication with the regulator means, the at least one sensor, and a display of the aircraft, a power margin referred to as the "limiting" power margin of the power plant relative to a power limit at the at least one operating rating;

transforming, by the processor, the limiting power margin into a collective pitch margin for the at least one operating rating, the collective pitch margin representing a margin between a current collective pitch of the blades of the main rotor and a collective pitch limit of the blades of the main rotor; and determining, by the processor, the collective pitch limit and displaying, by the processor, the collective pitch limit on the display for a pilot of the aircraft to view while operating the aircraft;

wherein transforming, by the processor, the limiting power margin into the collective pitch margin includes reducing the collective pitch margin relative to a real collective pitch margin proportional to the limiting power margin when the power margin is not zero in order for the processor to anticipate the regulator means overshooting the setpoint, due to the pilot changing the collective pitch of the blades of the main rotor rapidly during a transient stage of flight, so that the collective pitch limit displayed by the processor on the display for the pilot to view while operating the aircraft does not otherwise become erroneous, the collective pitch margin being zero when the limiting power margin is zero.

2. The piloting assistance method according to claim 1, wherein the processor uses a recursive algorithm in transforming the limiting power margin into the collective pitch margin, the recursive algorithm using a main relationship supplying the collective pitch margin at each current calculation instant as a function of a quotient of the limiting power margin divided by a denominator, the denominator being equal to the product of a first term multiplied by a second term, the first term being a function of the current collective pitch of the blades of the main rotor at the current calculation instant, and of a collective pitch limit at a previous calculation instant prior to the current calculation instant, the second term being a function of a predetermined coefficient reducing the power margin of the power plant.

3. The piloting assistance method according to claim 2, wherein, in order to determine the limiting power margin, the method comprises the following steps:
  determining a margin referred to as the "individual" margin for each monitoring parameter; and
  transforming each individual margin into a power margin referred to as the "individual" power margin, the limiting power margin being equal to the smallest individual power margin.

4. The piloting assistance method according to claim 2, wherein the first term is determined using the following relationship:

$$A1 = \theta_{limit}^{n-1} + \theta^n - 2*\theta_0$$

where "A1" represents the first term, "$\theta_{limit}^{n-1}$" represents the limit collective pitch limit at the previous calculation instant prior to the current calculation instant, "$\theta^n$" represents the current collective pitch, "$\theta_0$" represents a constant relating to a reference collective pitch, "=" represents the equals sign, "+" represents the addition sign, "−" represents the subtraction sign, and "*" represents the multiplication sign.

5. The piloting assistance method according to claim 2, wherein the second term is determined using the following relationship:

$$A2 = B*\sigma*Nr^3$$

where "A2" represents the second term, "B" represents the predetermined coefficient, "$\sigma$" represents an air density, "Nr" represents a parameter relating to the speed of rotation of the main rotor, and "*" represents the multiplication sign.

6. The piloting assistance method according to claim 2, wherein the predetermined coefficient is a variable that varies as a function of the speed of advance of the aircraft.

7. The method according to claim 2, wherein prior to transforming the limiting power margin into the collective pitch margin, the limiting power margin is reduced by a predetermined percentage if a speed of rotation of the main rotor decreases at a predetermined rate during a predetermined time.

8. The method according to claim 7, wherein the percentage decreases from a maximum to a zero value over a predetermined period.

9. The method according to claim 1, wherein during a predetermined aggressive stage of flight of the aircraft, the method includes a freezing step during which the collective pitch limit is kept equal to the value of the collective pitch limit as reached before the aggressive stage of flight.

10. The method according to claim 9, wherein the aggressive stage of flight is detected:
  if the collective pitch of the blades of the main rotor varies at a rate greater than a predetermined high rate of variation threshold; or
  if the collective pitch of the blades of the main rotor varies at a rate lying between a predetermined low rate of variation threshold and the high rate of variation threshold during a duration threshold; or
  if a variation in a speed of rotation of the main rotor is greater than a low threshold and if a control member controlling a pitch of blades of an auxiliary rotor is not operated; or
  if the variation in the speed of rotation of the main rotor is greater than a high threshold and if the control member is operated.

11. The method according to claim 9, wherein the freezing step is inhibited if a position of a control member controlling a pitch of blades of an auxiliary rotor varies at a travel speed greater than a threshold travel speed.

12. The method according to claim 9, wherein the freezing step is not inhibited if a position of a control member controlling a pitch of blades of an auxiliary rotor varies at a travel speed greater than a travel threshold and if the collective pitch of the blades of the main rotor varies at a rate greater than a predetermined high rate of variation threshold.

13. The method according to claim 1, wherein prior to displaying the collective pitch limit, the method includes a filtering step, the collective pitch limit being determined at a current calculation instant by applying the following filter:

$$\theta^n_{limdef} = (1-f)*\theta_{limitdef}^{n-1} + f*\theta_{limit}^n$$

where "$\theta^n_{limdef}$" represents the collective pitch limit at the end of the filtering step, "$\theta_{limitdef}^{n-1}$" represents the filtered collective pitch limit at the previous calculation instant prior to the current calculation instant, "$\theta_{limit}^n$" represents the collective pitch limit determined before the filtering step, "f" represents a filtering constant, "=" represents the equals sign, "+" represents the addition sign, "−" represents the subtraction sign, and "*" represents the multiplication sign.

14. The method according to claim 13 wherein a freezing step is performed by giving the filtering constant a value of zero.

15. The method according to claim 13, wherein on passing from an "aggressive" stage of flight to a predetermined stabilized stage of flight of the aircraft, the filter is applied for a predetermined duration with a filtering constant equal to a predetermined filtering constant for application during the stabilized stage of flight divided by four.

16. The method according to claim 13, wherein the value of the filtering constant is a function of a value of a variable referred to as the "control member" variable, the control member variable varying as a function of a travel speed of a control member controlling a pitch of blades of an auxiliary rotor.

17. The method according to claim 13, wherein the value of the filtering constant is a function of a value of a variable referred to as the "advance" variable, the advance variable varying as a function of a speed of advance of the aircraft.

18. The method according to claim 16, wherein the value of the filtering constant is a function of a value of a variable referred to as the "advance" variable, the advance variable varying as a function of a speed of advance of the aircraft and wherein the value of the filtering constant is equal to the product of a predetermined constant multiplied by the greater of the advance variable and the control member variable.

19. A piloting assistance device for assisting the piloting of an aircraft having a power plant including at least one engine and a main rotor contributing to at least part of the lift and/or propulsion of the aircraft, the main rotor having blades, the aircraft being a rotorcraft, each engine being controlled by regulator means of the aircraft as a function of a setpoint, the power plant being monitored by at least one sensor determining values for a plurality of predetermined monitoring parameters, the piloting assistance device comprising:
  a display; and
  a processor in communication with the regulator means, the at least one sensor, and the display;
  the processor for at least one operating rating of the at least one engine being configured to:

determine a power margin referred to as the "limiting" power margin of the power plant relative to a power limit at the at least one operating rating;

transform the limiting power margin into a collective pitch margin for the at least one operating rating, the collective pitch margin representing a margin between a current collective pitch of the blades of the main rotor and a collective pitch limit of the blades of the main rotor; and determine the collective pitch limit and display the collective pitch limit on the display for a pilot of the aircraft to view while operating the aircraft;

wherein to transform the limiting power margin into the collective pitch margin the processor is further configured to reduce the collective pitch margin relative to a real collective pitch margin proportional to the limiting power margin when the power margin is not zero in order for the processor to anticipate the regulator means overshooting the setpoint, due to the pilot changing the collective pitch of the blades of the main rotor rapidly during a transient stage of flight, so that the collective pitch limit displayed by the processor on the display for the pilot to view while operating the aircraft does not otherwise become erroneous, the collective pitch margin being zero when the limiting power margin is zero.

20. The piloting assistance device according to claim 19, wherein the piloting assistance device comprises at least one of the following members:

a regulator system controlling each engine;

a measurement system measuring a parameter relating to the collective pitch of the blades of the main rotor;

a measurement system measuring a parameter relating to a current speed of rotation of the main rotor;

a measurement system measuring a value relating to each monitoring parameter;

a measurement system measuring a value relating to a pressure of ambient air present outside the aircraft;

a measurement system measuring a value relating to a temperature of ambient air present outside the aircraft;

a measurement system measuring a value relating to a speed of advance of the aircraft; and a measurement system measuring a value relating to a position of a control member controlling a pitch of blades of an auxiliary rotor of the aircraft.

21. An aircraft comprising:

a power plant including at least one engine and a main rotor contributing at least in part to providing the aircraft with lift and/or propulsion, the main rotor having blades;

regulator means which control each engine as a function of a setpoint;

at least one sensor determining values for a plurality of predetermined monitoring parameters of the power plant;

a display; and a processor in communication with the regulator means, the at least one sensor, and the display;

the processor for at least one operating rating of the at least one engine being configured to:

determine a power margin referred to as the "limiting" power margin of the power plant relative to a power limit at the at least one operating rating;

transform the limiting power margin into a collective pitch margin for the at least one operating rating, the collective pitch margin representing a margin between a current collective pitch of the blades of the main rotor and a collective pitch limit of the blades of the main rotor; and determine the collective pitch limit and display the collective pitch limit on the display for a pilot of the aircraft to view while operating the aircraft;

wherein to transform the limiting power margin into the collective pitch margin the processor is further configured to reduce the collective pitch margin relative to a real collective pitch margin proportional to the limiting power margin when the power margin is not zero in order for the processor to anticipate the regulator means overshooting the setpoint, due to the pilot changing the collective pitch of the blades of the main rotor rapidly during a transient stage of flight, so that the collective pitch limit displayed by the processor on the display for the pilot to view while operating the aircraft does not otherwise become erroneous, the collective pitch margin being zero when the limiting power margin is zero.

\* \* \* \* \*